United States Patent
Sommer et al.

(10) Patent No.: US 6,775,335 B2
(45) Date of Patent: Aug. 10, 2004

(54) METHOD AND APPARATUS FOR EQUALIZATION AND TRACKING OF CODED DIGITAL COMMUNICATIONS SIGNALS

(75) Inventors: Naftali Sommer, Rishon le Zion (IS); Ofir Shalvi, Herzlia (IS)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/406,029

(22) Filed: Apr. 2, 2003

(65) Prior Publication Data

US 2003/0189994 A1 Oct. 9, 2003

Related U.S. Application Data

(62) Division of application No. 09/778,122, filed on Feb. 5, 2001, now Pat. No. 6,647,071, which is a continuation of application No. 09/434,836, filed on Nov. 5, 1999, now abandoned.
(60) Provisional application No. 60/107,421, filed on Nov. 6, 1998.

(51) Int. Cl.[7] .............................................. H04L 27/06
(52) U.S. Cl. ...................... 375/341; 375/262; 375/265; 714/795
(58) Field of Search ................................ 375/262, 265, 375/341, 340; 714/792, 795, 796, 794

(56) References Cited

U.S. PATENT DOCUMENTS

| | | | | | |
|---|---|---|---|---|---|
| 5,509,021 | A | * | 4/1996 | Todoroki | 714/795 |
| 5,588,011 | A | * | 12/1996 | Riggle | 714/792 |
| 5,987,490 | A | * | 11/1999 | Alidina et al. | 708/523 |
| 2002/0016946 | A1 | * | 2/2002 | Yamanaka et al. | 714/795 |
| 2003/0066022 | A1 | * | 4/2003 | Yamanaka et al. | 714/523 |

* cited by examiner

Primary Examiner—Jean B. Corrielus
(74) Attorney, Agent, or Firm—Frederick J. Telecky, Jr.; W. James Brady, III

(57) ABSTRACT

A symbol detector provides a delay-less estimate of a transmitted symbol. The symbol detector includes a symbol input for receiving a sequence of input symbols, a plurality of accumulators (ACC) for storing trellis state costs, a plurality of adders (202) for summing the square of distances between an input symbol and a constellation symbol for a trellis branch with the trellis state costs, and a plurality of comparators (203) connected to the adders for determining minimum costs and providing those costs to the accumulators. A memory (201) is connected to an associated comparator for storing the minimum cost determined the associated comparator. A minimization unit (204) outputs an index value of comparators with the lowest value, and a branch table unit (205) outputs a delay-less estimate of a transmitted symbol based on the index of the trellis branch with lowest cost that enters the trellis state with lowest cost and an input symbol.

1 Claim, 2 Drawing Sheets

METHOD AND APPARATUS FOR EQUALIZATION AND TRACKING OF CODED DIGITAL COMMUNICATIONS SIGNALS

This application is a division of application Ser. No. 09/778,122 filed Feb. 5, 2001, now U.S. Pat. No. 6,647,071 which is a cont. of Ser. No. 09/434,836, filed Nov. 5, 1999, now abandoned which claims priority under 35 U.S.C. 119(e)(1) of Provisional Application Serial No. 60/107,421, filed Nov. 6, 1998.

TECHNICAL FIELD OF THE INVENTION

The present invention relates to digital communications and more particularly, to method and apparatus for equalization and tracking of coded digital communications signals.

BACKGROUND OF THE INVENTION

Decision feedback equalizer (DFE) and decision directed (DD) tracking loops are well known tools for equalization of digital communications signals and for adaptive compensation of dynamic channel impairments, phase noise, carrier frequency error, and dynamic impairments of the transmitter and the receiver. DFE and DD loops are based on a decision on the transmitted symbols. In the prior art, the decision rule is a memoryless "nearest neighbor" rule (also called "slicer") which yields the element in the set of transmitted symbols (i.e. the transmitted constellation) that has the smallest distance to the equalizer's output data point or estimated symbol. However, when the signal is coded by a forward error correction (FEC) coder this slicer decision is less accurate than a decision which is taken by a decoder which exploits the FEC, i.e. uses the code to get better symbols. This is particularly a severe effect in systems that use trellis coded modulations (TCM) since TCM coders expand the constellation which effectively results in a decreased SNR. For example, the TCM coder of an Advanced Television System Committee (ATSC) digital TV (DTV) transmitter expands the constellation from 4-PAM to 8-PAM which increases the error probability of the slicer by a factor that is equivalent to a 6 dB decrease in SNR. The slicer errors propagate back through the DFE and increase the error at the equalizer output. This effect is particularly severe in situations where the DFE taps have large magnitudes, e.g. when there are reflections in the channel, or when the signal is contaminated by narrowband noise. Furthermore, the slicer's errors cause tracking errors in the symbol clock and carrier recovery activities.

Long, Ling and Proakis ("Adaptive transversal filters with delayed coefficients adaptation", *Proc. Int. Conf. Acoustics, Speech, Signal Processing*, Dallas, Tex., March, 1987) have proposed tracking the signal parameters in a DD manner, using a FEC decoder output. However, their approach adds decoding delay to the tracking loops which degrades the ability to track fast changes in phase noise, for example caused by changing reflections. The Long, Ling and Proakis approach is based on a linear equalization scheme, and it does not address the problem of error propagation in a DFE.

Eyuboglu and Qureshi ("Reduced-state sequence estimation for coded modulation on inter-symbol interference channels", *IEEE Journal on Selected Areas in Communications*, August 1989) proposed an approach that jointly performs both equalization and TCM decoding. This approach, which is based on a reduced complexity approximation of the maximum likelihood sequence estimator (MLSE) Viterbi algorithm, may prevent degradation due to slicer errors, and it is aimed at achieving the performance of an MLSE based receiver, which is better than the performance of a DFE based receiver. However, the complexity of the Eyuboglu and Qureshi approach is much higher than the complexity of a DFE based receiver.

SUMMARY OF THE INVENTION

According to one embodiment of the present invention, a symbol detector in a decision feedback equalizer (DFE) loop is provided which exploits the structure of a forward error correction (FEC) encoder and outputs delay-less symbol estimates $â_0(t)$, where t is the time-index of the symbol. These estimates are fed back to a DFE loop and to a decision directed (DD) tracking loop. The symbol detector is also capable of generating delayed symbol estimates $â_N(t)$, where N is the decision delay (where the higher delay estimates are likely to be more accurate than the low delay estimates), that are also fed back to the DFE and DD tracking loops. The DFE loop is capable of using $â_N(t)$ as an input to its N,N+1,N+2, . . . taps. Should $â_N(t) \neq â_m(t)$, where N>M, the tracking loops are capable of correcting their parameters' estimates accordingly, and the DFE loop is capable of repeating its last N-M iterations, using the more recent estimates. The outputs of the symbol detector may be a compromise (i.e. weighted average) between multiple constellation symbols, where the averaging weights depend on the estimated likelihood of each of these symbols.

The advantages of the proposed method and apparatus of the present invention are that the complexity of the present invention is similar to that of a conventional DFE receiver, but the error rate of the symbol detector is lower (and in some case, much lower) than those of a prior art slicer, yet no delay is added to the DD and DFE loops.

The method and apparatus of the present invention are particularly designed for equalization and phase tracking of digital terrestrial TV (DTV) signals transmitted according to the ATSC standard using vestigial side band (VSB) modulation, and digital signals transmitted over cable TV plants according to the DOCSIS spec using QAM modulation.

When applied to a VSB signal, the method of the present invention allows for combating severe NTSC co-channel-interference (CCI). Prior art methods for combating NTSC CCI degraded the noise threshold of the receiver by 3 dB ("NTSC co-channel reduction system" U.S. Pat. No. 5,821,988, Citta et al., October 1998), while the method of the present invention allows for combating severe NTSC CCI without harming the noise threshold by more than a fraction of a dB.

BRIEF DESCRIPTION OF THE DRAWINGS

For a more complete understanding of the present invention, and the advantages thereof, reference is now made to the following detailed description taken in conjunction with the accompanying drawings, in which.

DETAILED DESCRIPTION

Figure 1:
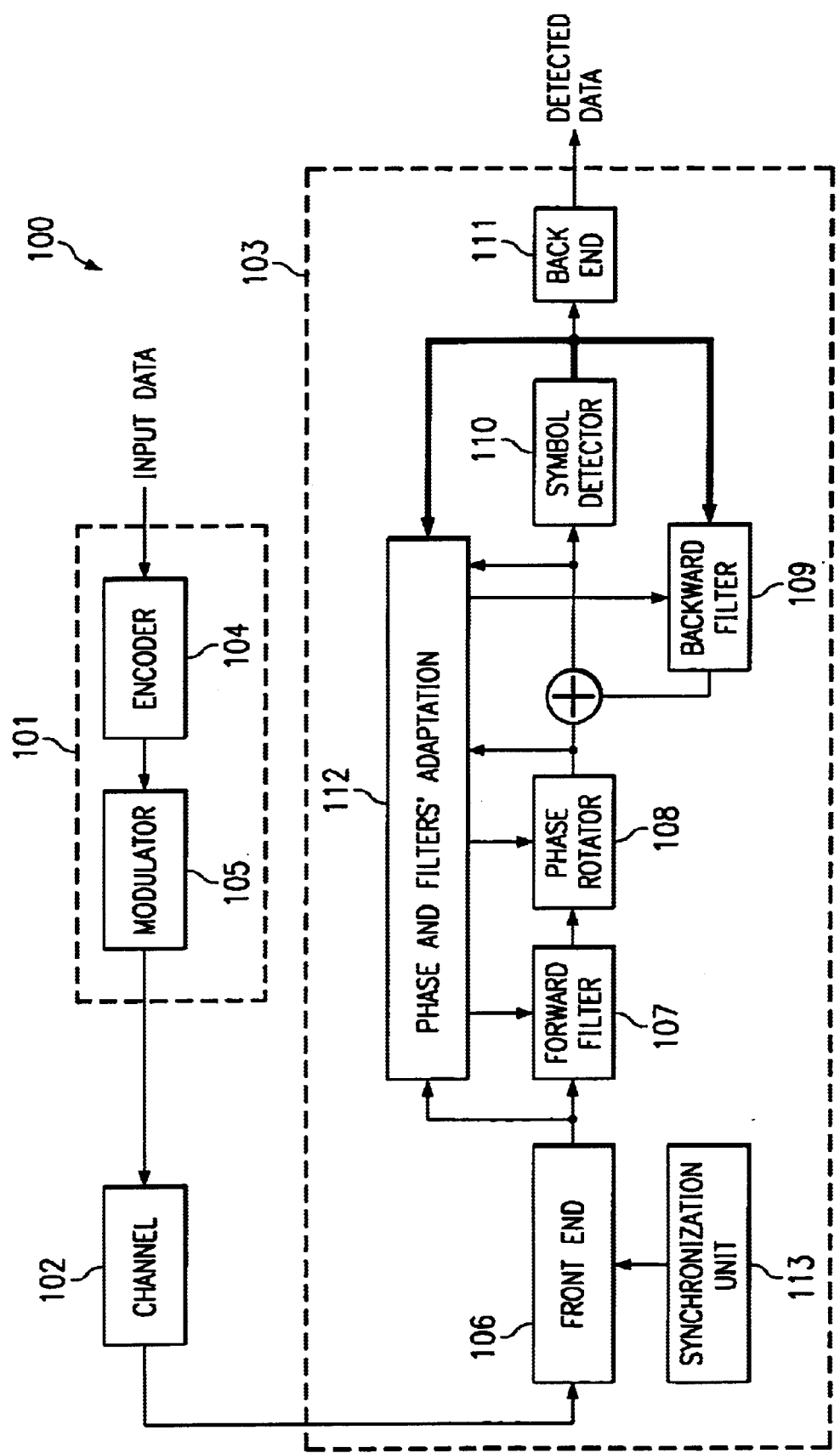
FIG. 1 depicts a communications system employing the techniques of the present invention.

The present invention provides a method and apparatus for equalization and tracking of coded digital communications signals allowing for high performance in the presence of inter-symbol-interference, additive noise, and phase noise. This invention is particularly useful for equalization and phase tracking of digital terrestrial TV signals transmitted according to the ATSC standard using VSB modulation, and for digital signals transmitted over cable TV plants according to the DOCSIS specifications and using QAM modulation. For a receiver, the method and apparatus include:

1) a front end unit for receiving an analog signal representative of a data stream having a structure from a forward error correction encoder (e.g. which is encoded with data redundancy), for down-converting it from an estimated carrier frequency, for filtering out of band signals and for generating a sequence of samples at a sampling rate which is a rational product of an estimated symbol rate;

2) a synchronization unit for estimating the carrier frequency and the symbol rate of the received signal;

3) an equalizer and detector unit for receiving the output of the front end unit, for compensating for possibly time varying inter-symbol-interference, for phase noise, carrier and symbol timing offsets, AM hum, filtering noise and interference, and for detecting the transmitted data, which includes:

a) a forward filter for receiving the output of the front end unit, for performing a linear filtering operation using a filter with adjustable parameters and for generating a sequence at the estimated symbol rate, b) a phase rotator for compensating for the effect of an estimated carrier phase offset of the received signal at the input of the symbol detector, c) a symbol detector for receiving the sum of the outputs of the forward filter and the backward filter and for detecting the transmitted symbols by exploiting the structure of the data redundancy within the signal and for generating delay-less symbol estimates $\hat{a}_0(t)$, where t is the time-index of the symbol, and optionally for generating a delayed symbol estimate $\hat{a}_N(t)$, where N is the decision delay, d) a backward filter for performing a linear filtering operation on the outputs of the symbol detector $\hat{a}_0(t)$ using a filter with adjustable parameters, and when the symbol detector generates delayed symbol estimates, for using $\hat{a}_N(t)$ as input to the section of the filter which processes elements with delay larger than N, and e) a tracking and acquisition unit for adapting the receiver's operational parameters, including the carrier phase of the rotator and the parameters of the forward filter and the backward filter, in order to track channel and signal impairment, by using the outputs of the symbol detector, and 4) a back end unit for performing a decoding operation matched to the encoding operation that has been performed on the signal (e.g. de-randomizing, de-interleaving, FEC decoding, de-framing) and restoring the transmitted data bits.

The present invention also preferably provides a symbol detector in a DFE loop which exploits the structure of the FEC encoder, that is the past data in the FEC, and outputs delay-less symbol estimates $\hat{a}_0(t)$, where t is the time-index of the symbol. These estimates are fed back to a DFE loop and to a DD tracking loop. The symbol detector is also preferably capable of generating delayed symbol estimates $\hat{a}_N(t)$, where N is the decision delay (where the higher delay estimates are likely to be more accurate than the low delay estimates), that are also fed back to the DFE and to the DD tracking loops. The DFE is capable of using $\hat{a}_N(t)$ as an input to its N,N+1,N+2, . . . taps. Should $\hat{a}_N(t) \neq \hat{a}_M(t)$, where N>M, the tracking loops are capable of correcting their operational parameters' estimates accordingly, and the DFE is capable of repeating its last N-M iterations, using the more recent estimates. The outputs of the symbol detector may be a compromise (i.e. weighted average) between multiple constellation symbols, where the averaging weights can depend on the estimated likelihood of each of these symbols, which in turn may be based upon the symbol's distance from the data point or estimated symbol.

The advantages of the method and apparatus of the present invention are that the complexity of the approach is similar to that of a conventional DFE receiver, but the error rate of the symbol detector is lower (and in some case, much lower) than those of prior art slicer, without adding delay to the DD and the DFE loops.

As a result, the performance of a receiver based on the symbol detector of the present invention approaches the performance of a receiver having a DFE and a FEC decoder in cascade, where there are no errors in the inputs to DFE. It may significantly improve the MSE (mean square error) for error bursts at the output of the DFE, and improve the tracking ability of the receiver and its phase noise performance. As a result the method and apparatus of the present invention improve a receiver's noise rejection in the presence of channel reflection, narrowband interference, and phase noise.

The method and apparatus of the present invention are particularly designed for equalization and phase tracking of digital terrestrial TV (DTV) signals transmitted according to the ATSC standard using VSB modulation, and for digital signals transmitted over cable TV plants according to the DOCSIS specifications using QAM modulation.

When applied to a VSB signal, the method of the present invention allows for combating severe NTSC co-channel-interference (CCI). Prior art methods for combating NTSC CCI degraded the noise threshold of the receiver by 3 dB ("NTSC co-channel reduction system" U.S. Pat. No. 5,821,988, Citta et al., October 1998), while the method of the present invention allows for combating severe NTSC CCI without harming the noise threshold by more than a fraction of a dB.

FIG. 1 depicts a digital communication system 100 employing the techniques of the present invention. As one representative example, the system 100 may operate on a terrestrial TV channel and comply with the "Digital Television Standard (Annex D)", ATSC, Sep. 16, 1995. More particularly, the system 100 consists of a transmitter 101, a terrestrial channel or transmission media 102, and a receiver 103.

For the representative example, the transmitter 101 is operating according to the Digital TV Standard. It includes an encoder 104 and a modulator 105. The transmitter 101 receives a stream of data bits at a nominal rate of 19.39 Megabits per second. The encoder applies a cascade of randomizer, Reed-Solomon FEC encoder (outer FEC encoder), interleaver, and twelve rate 2/3 TCM encoders that generate 8-PAM symbols having a constellation $\{-7,-5,-3,-1,1,3,5,7\}$, where each TCM encoder operates only every $12^{th}$ symbol. The output of the encoder, which is an 8-PAM sequence at a rate of 10.76 Mega-symbols per second, is modulated by unit 105 to the RF band using a VSB modulation scheme.

The terrestrial channel or transmission media 102 is characterized by reflections that may be time varying, with co-channel and adjacent interference from NTSC and ATSC signals, narrow band RF interference, and additive noise.

The receiver 103 includes a front-end unit 106, which down-converts the signal from the RF band to baseband, converts it from analog to digital, re-samples it to an estimated symbol rate, and filters out of band signals using a square root raised cosine filter. Unit 106 further synchronizes on carrier frequency error using its pilot tone, and on the symbol rate of the signal.

The forward filter 107 is a T-spaced FIR equalizer. Note that the receiver can alternatively be based on an FSE (fractionally spaced equalizer). The rotator unit 108 generates a quadrature sequence by filtering the equalizer's output by an FIR Hilbert filter, multiplies the quadrature sequence and the equalizer output by $\sin(\phi(t))$ and $\cos(\phi(t))$, respectively, where $\phi(t)$ is the estimated phase of the signal at time t, and sums the two sequences.

The rotated sequence is summed with the output of the backward filter 109. The backward filter is an FIR filter having $L \geq 0$ taps. The summed sequence, which actually forms an approximation to the transmitted symbols, is an input to the symbol detector 110.

The symbol detector generates three output sequences: 1) $\hat{a}_0(t)$, 2) $\hat{a}_{12}(t)$ having values in the continuous range $[-7,7]$, which are the estimated symbols at time t provided with delays of 0 and 12 symbol periods, respectively, and 3) $\hat{b}(t)$ which is the estimate to the sequence of data bits at the input to the TCM encoder at the transmitter 101 (having values of 0 or 1). For non-ATSC applications, the delays associated with $\hat{a}_0(t)$ and $\hat{a}_{12}(t)$ may be other than 0 and 12 symbol periods. Also, more than two sequences can be generated, such as $\hat{a}_{N1}(t)$, $\hat{a}_{N2}(t)$, $\hat{a}_{N3}(t)$, etc. The sequences $\hat{a}_0(t)$ and $\hat{a}_{12}(t)$ are provided to the backward filter 109 where they are used as input to taps 0.11 (i.e. the first twelve taps), and taps 12,13,14, ... L (assuming L>11), respectively. Again, for different delays the sequences are appropriately used in the associated taps.

The detected data bits $\hat{b}(t)$ are processed by the back-end unit 111 which applies a de-interleaver, Reed-Solomon decoder, and de-randomizer, and detects the data at the input of the transmitter. The detected data is the output of the receiver.

The estimated symbol sequences $\hat{a}_0(t)$ and $\hat{a}_{12}(t)$ are provided to the phase & filter's adaptation unit 112. Again, for different delays the sequences are appropriately used in unit 112. This unit 112 adapts the coefficients of the forward filter 107 and the backward filter 109, as well as the phase parameter $\phi$ of the rotator unit 108. The adaptation unit 112 applies LMS algorithm for adapting the receiver's operational parameters based on minimization of a mean-square-error criterion, such as conventional algorithms, given in e.g. J. G. Proakis, "Digital Communications", McGrew Hill, 1995, wherein the slicer's outputs used by a conventional receiver in a DD tracking mode are replaced by $\hat{a}_0(t)$, and where the algorithm takes into account possible changes between $\hat{a}_0(t)$ and $\hat{a}_{12}(t)$. The forward filter parameters are adjusted in the following manner:

$$c_n(t+1)=c_n(t)-\delta_c[(z(t)-\hat{a}_0(t))y(t-n)-(\hat{a}_{12}(t-12)-\hat{a}_0(t-12))y(t-12-n)]$$

where $c_n(t)$ is the n-th tap of the forward filter at time t, $\delta_c$ is a step size (that may be time varying), y(t) is the input sequence to the forward filter, and z(t) is the input sequence to the slicer. The coefficients of the feedback filter are adapted in the following manner for n<12.

$$d_n(t+1)=d_n(t)-\delta_c[(z(t)-\hat{a}_0(t))\hat{a}_0(t-n)-\hat{a}_{12}(t-12)\hat{a}_{12}(t-12-n)+\hat{a}_0(t-12)\hat{a}_0(t-12-n)]$$

where $d_n(t)$ is the n-th tap of the backward filter at time t. For n>11 the $\hat{a}_0(\cdot)$ on the right hand side of the products terms in the above formula are replaced by $\hat{a}_{12}(\cdot)$.

The phase parameter of the rotator is updated in the following manner:

$$\phi(t+1)=\phi(t)-\delta_\phi g(t)(z(t)-\hat{a}_0(t))+\delta_\phi g(t-12)(\hat{a}_{12}(t-12)-\hat{a}_0(t-12))$$

where $g(t)=\tilde{x}(t)\cos(\phi(t))-x(t)\sin(\phi(t))$, where x(t) is the output of the forward filter, and where $\tilde{x}(t)$ is the quadrature sequence generated in unit 108.

For non-ATSC applications, the delay of 12 in the above equations can be replaced by an arbitrary delay N. Also, more than two estimated symbol sequences can be generated (i.e. $\hat{a}_{N1}(t)$, $\hat{a}_{N2}(t)$, $\hat{a}_{N3}(t)$, etc.) and the equations are then modified appropriately. If a simpler implementation is needed then only $\hat{a}_0(t)$ can be generated. In that case, the performance enhancement due to using the improved decisions as input to the feedback section of the DFE will still exist, but the equalizer adaptation will be slightly degraded, because decision errors that could be retroactively fixed in the future will not be fixed. In this case, the adaptation equations are:

$$c_n(t+1)=c_n(t)-\delta_c[(z(t)-\hat{a}_0(t))y(t-n)]$$

$$d_n(t+1)=d_n(t)-\delta_c[(z(t)-\hat{a}_0(t))\hat{a}_0(t-n)]; \text{ and}$$

$$\phi(t+1)=\phi(t)-\delta_\phi g(t)(z(t)-\hat{a}_0(t)).$$

The present invention also provides a phase compensation unit within the equalizer, and a phase tracking algorithm. Prior art publications ("Guide to the use of the ATSC Digital Television Standard", ATSC, October 1995) have proposed a receiver in which the phase rotator is located in cascade to the equalizer, and not within the DFE loop. The present invention provides a DFE equalizer structure in which the phase rotator is located in the DFE loop. This allows better performance in the case of high level phase noise. An LMS algorithm is provided for adapting the rotator's phase using the stochastic gradient of a mean-square-error (MSE) criterion.

Figure 2:
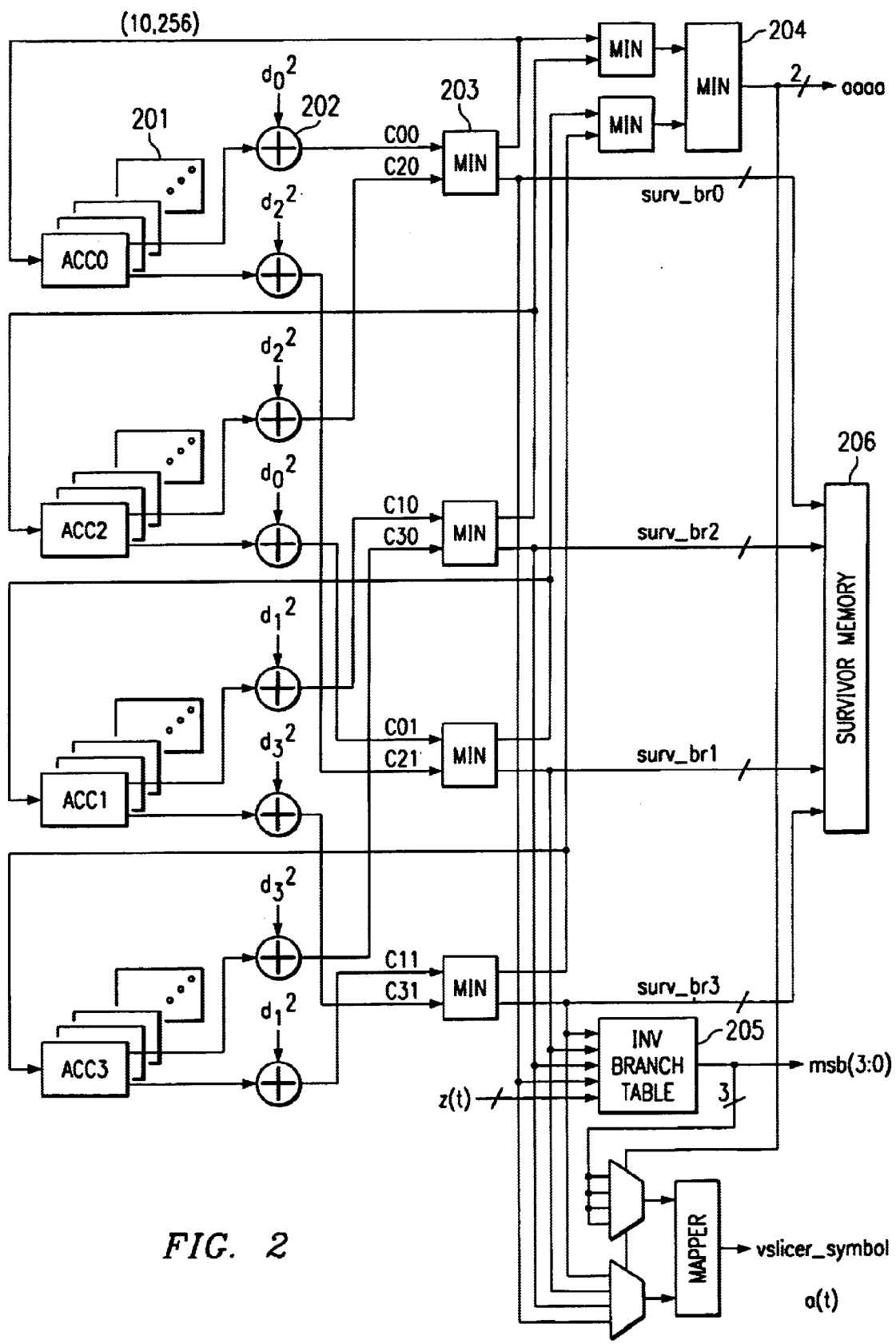
FIG. 2 depicts a representative example of a symbol detector employing the techniques of the present invention.

FIG. 2 depicts a structure for a symbol detector 110 of the present invention. The detector's algorithm is an extension of the Viterbi algorithm for cost minimization among the transmittable TCM code sequences, which generates a zero delay and a single iteration delay estimate to the channel symbols.

Accumulators acc0, acc1, acc2, and acc3 (201) store the cost of trellis states 0, 1, 2, and 3 respectively. These four costs are summed by the eight adders 202 with the square distances between the input to the symbol detector (z(t)) and the constellations symbols that corresponds to the trellis branches that depart states 0, 1, 2, and 3. The four minimization units 203 compare between outputs of pairs of adders 202 which correspond to the pairs of trellis branches that enter states 0, 1, 2, or 3, respectively. Units 203 output the minimum cost (among their two inputs) and transfer it to units 201 where it is stored. The indexes of the inputs with the lowest values to units 203 (having values of 0 or 1), which are denoted "surv_br0", ... "surv_b3", are stored in a survivor memory 206. Unit 204 outputs the index of the minimization unit having the lowest value at its output (having a value of 0 ... 3). Unit 205 generates a delay-less estimate $\hat{a}_0(t)$ to the transmitted 8-PAM symbol based on the index of the trellis-branch with lowest cost that enters the trellis-state with the lowest cost and based on the symbol detector's input (z(t)). The delay-less estimate is an element in the trellis subset which corresponds to this branch. The delayed symbol estimate $\hat{a}_{12}(t)$ is generated in a similar manner to the delay-less symbol estimate $\hat{a}_0(t)$. The detected data bits $\hat{b}(t)$ are generated by performing back tracking operations on the survivor memory. Finally, the symbol detector unit has twelve identical decoder hardware units and it circulates between the twelve copies, using each once per twelve symbols. This is because the encoder employs twelve TCM encoders that are interleaved in time.

For non-ATSC applications, the symbol detector 110 may contain any possible implementation of a Viterbi decoder (such as described in "Data communications principles", R. D. Gitlin, J. F. Hayes, S. B. Weinstein, Plenum Press, 1992) that decodes the error correcting code, with a slight modification. This modification is that in a standard Viterbi decoder, the symbol decisions are made with a delay, and therefore can not be used as input to the DFE. The larger the delay, the better the performance, since more "future" data is used for the decision on the present symbol. The symbol detector 110 is a Viterbi detector that makes a decision with delay zero, by using only past information. Its performance will be lower than the standard decoder, but much better than the memoryless slicer that is usually used for providing delayless decisions to the DFE.

Note that for implementing the symbol detector 110, there is no need to add another Viterbi decoder. The existing decoder (which is usually present, for decoding the FEC code) can be used, with an additional feature. In addition to the backtracking that is done for getting the delayed decisions (where the backtrack length equals the delay), another "zero length backtracking" is done, by simply taking the best current state and input soft decision, and deciding what symbol corresponds to it. This can be seen in FIG. 2 for the ATSC case, where the figure shows the standard Viterbi decoder for the FEC code that is used in ATSC, except for the backtrack unit, which is not shown. Blocks 204 and 205 are the additional blocks that have been added to get the zero delay decision.

The present invention is capable of being implemented in software, hardware, or combinations of hardware and software. Although the present invention has been described in detail herein with reference to preferred embodiments, it should be understood that this description is by way of example only, and is not to be construed in a limiting sense. It is to be further understood that various changes, substitutions and alterations may be made to the embodiments described herein, and additional embodiments of the invention, will be apparent to, and may be made by, persons of ordinary skill in the art having reference to this description. It is contemplated that such changes and embodiments are within the spirit and scope of the invention, as defined in the appended claims.

What is claimed is:

1. A symbol detector, comprising:

a symbol input for receiving a sequence of input symbols, a plurality of accumulators for storing trellis state costs, a plurality of adders for summing the square of distances between said input symbols and constellation symbols corresponding to trellis branches with the trellis state costs, a plurality of comparators connected to said adders for determining minimum costs and providing those costs to said accumulators, a memory connected to said comparators for storing indices of inputs with the lowest value, means for outputting an index value of comparators with the lowest value, and means for outputting a delay-less estimate of a transmitted symbol based on the index of the trellis branch with lowest cost that enters the trellis state with lowest cost and said input symbols.

* * * * *